US007246748B1

(12) United States Patent
Feuerman et al.

(10) Patent No.: US 7,246,748 B1
(45) Date of Patent: Jul. 24, 2007

(54) ENABLING THE USE OF MACHINE-READABLE CODES

(75) Inventors: Kenneth E. Feuerman, Fremont, CA (US); Daniel Baum, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 208 days.

(21) Appl. No.: 10/882,963

(22) Filed: Jun. 30, 2004

(51) Int. Cl.
*G06K 7/10* (2006.01)
(52) U.S. Cl. ................................. 235/462.09
(58) Field of Classification Search ........... 235/462.09, 235/462.01, 462.25
See application file for complete search history.

(56) References Cited

U.S. PATENT DOCUMENTS

| | | | |
|---|---|---|---|
| 5,060,980 A | | 10/1991 | Johnson et al. |
| 5,486,686 A | | 1/1996 | Zdybel, Jr. et al. |
| 5,825,006 A | * | 10/1998 | Longacre et al. ...... 235/462.27 |
| 6,540,142 B1 | | 4/2003 | Alleshouse |
| 6,624,826 B1 | | 9/2003 | Balabanovic |
| 6,764,009 B2 | | 7/2004 | Melick et al. |
| 6,823,075 B2 | * | 11/2004 | Perry .......................... 382/100 |
| 6,882,737 B2 | * | 4/2005 | Lofgren et al. ............. 382/100 |
| 2004/0153968 A1 | | 8/2004 | Ching et al. |
| 2005/0061890 A1 | * | 3/2005 | Hinckley ................... 235/494 |

OTHER PUBLICATIONS

"ultraforms 2-D Barcodes for PDF Forms", Dataintro Software, [online] http://www.dataintro.com [retrieved] Apr. 28, 2005.
"Barcode Recognition Software", Barcode recognition from raster image, Data Matrix, QR Code, Linear Barcodes, [online] http://www.axtel.com, [retrieved] May 2, 2005.
"Create New Advantage. Symbol. The Enterprise Mobility Company", [online] file://C:DOCUMe~1\rpi/LOCALS~1\Temp\7RRE890T.htm [retrieved] May 2, 2005.
Barnes, et al. "Two Dimensional Bar Coding", Purdue University, Tech 621, Spring, 1999 pp. 1-46.
Harvey Spencer Associates, Inc. "Forms Capture and Forms Processing", http://www.hsassocs.com/products/forms_capture.html, 2001, last updated Oct. 16, 2002, 3 pages.

(Continued)

*Primary Examiner*—Daniel Stcyr
(74) *Attorney, Agent, or Firm*—Fish & Richardson P.C.

(57) ABSTRACT

Methods and apparatus, including computer systems and program products, for enabling the use of machine-readable codes. A computer program receives data generated by reading a machine-readable code and detects the presence of formatting information indicating whether the data's payload is in a first or second format. The program uses a first or second procedure to decode the payload depending on whether the formatting information is detected and what it specifies. In some embodiments, the formatting information can include information about how to decode the payload. The machine-readable code can have been produced according to an encoding instruction associated with an electronic document. The first and second formats can be open and closed formats, respectively. The use of multiple formats can enable multiple, co-existing business models in a document workflow, whereby different parties in the workflow can be charged or required to obtain authorization for the use of machine-readable codes.

59 Claims, 5 Drawing Sheets

OTHER PUBLICATIONS

Harvey Spencer Associates, Inc. "Standard to encode Data on Forms", http://www.hsassocs.com/prelim%20encode%20std.pdf , downloaded from the Internet on Jul. 23, 2003 (undated), 9 pages.

Captiva Software Corporation "Products>FormWare>FormWare Enterprise, Features", http://www.captivasoftware.com/products/formware6.asp, 2002, 2 pages.

Captiva Software Corporation "Products>FormWare>FormWare Enterprise, Universal Information Capture Software", http://www.captivasoftware.com/products/formware1.asp, 2002, 2 pages.

Captiva Software Corporation "Products>FormWare>FormWare Enterprise, Powerful features", http://www.captivasoftware.com/products/formware2.asp, 2002, 2 pages.

Captiva Software Corporation "Products>FormWare>FormWare Enterprise, Easy Setup and Administration", http://www.captivasoftware.com/products/formware3.asp, 2002, 2 pages.

Captiva Software Corporation "Products>FormWare>FormWare Enterprise, Distributed Process", http://www.captivasoftware.com/products/formware4.asp, 2002, 2 pages.

Captiva Software Corporation "Products>FormWare>FormWare Enterprise, Solutions for your Industry", http://www.captivasoftware.com/products/formware5.asp, 2002, 2 pages.

Systems Imaging, Inc. "I. Data Capture, OCR, Forms Design & Processing", http://www.sysimaging.com/datacapture.htm, 2002, 4 pages.

"ScanSoft Capture Development System 12 Adds Asian OCR, Combines Superior Accuracy and Speed with PDF and XML", Business Wire, No. 5461, Apr. 7, 2003, 5 pages.

ScanSoft, Inc. "Home>Products>Capture Development System, Key Features", http://www.scansoft.com/capturesdk/features.asp, 2003, 2 pages.

ScanSoft, Inc. "ScanSoft Capture Development System 12 Adds Asian OCR, Combines Superior Accuracy and Speed with PDF and XML", http://www.scansoft.com/news/pressreleases/2003/20030407_capture.asp, Apr. 7, 2003, 5 pages.

ScanSoft, Inc. "Home>Products>Capture Development System, Product Overview", http://www.scansoft.com/capturesdk/overview.asp, 2003, 4 pages.

ScanSoft, Inc. "Home>Products>Capture Development System, Integrated PDF Toolkit", http://www.scansoft.com/capturesdk/pdftoolkit, 2003, 2 pages.

Image Access, "The Performance Scan Station for Stand Alone and Network Environments", http://www.imageaccess.de/ger/bscan-standard.html, 1999, last updated Jun. 15, 2000, 7 pages.

"Cardiff's LiquidOffice™ eForm Management System Selected by the City of Boston to Replace its Manual Form Processes", PR Newswire, No. LAM04213052002, May 13, 2002, 3 pages.

Global Data Solutions, "Can Your Company Use Formatta eForms?", downloaded from the Internet Aug., 2003 (undated), 2 pages.

DCS, "What is Data Capture?", http://www.dsc-va.com/page30.html, downloaded from the internet Sep., 2003 (undated), 3 pages.

AnyDoc Software, Inc. "The Solution for Capturing all the vital Data and Images From Your Documents", http://www.mti-info.com/Products/OCRforAnyDoc/main.asp, downloaded from the internet Aug., 2003 (undated), 2 pages.

ReadSoft AB, "Forms5 Product Overview", 2002, pp. 1-30.

"Input Software: Initial Three Products Attain InputAccel Certification to Solve Data Capture Requirements", Business Wire, Oct. 22, 1998, 3 pages.

Cardiff Software, Inc. "Information Capture System", 1991-2002, 10 pages.

Seward COnsulting, Inc. "Products, Forms Processing", http://www.sewardconsulting.com/Imaging/products_datacapture.htm, downloaded from the Internet Sep., 2003 (undated), 10 pages.

IBM Corporation, "IBM Intelligent Forms Processing Services Offering", downloaded from the Internet Aug., 2003 (undated), 8 pages.

CNET Networks, Inc. "Kofax Ascent Capture v5.51", http://www.zdnet.com.au/reviews/software/business/story/1,200002355520270277-3.00.htm, 2003, 5 pages.

IBM Corporation, "how IFP works>Data Capture, Scan & Import", http:///www2.clearlake.ibm.com/GOV/ifp/data_capture.html, downloaded from the Internet October, 2003 (undated), 1 page.

IBM Corporation, "how IFP works>Data Verification", http://www2.clearlake.ibm.com/GOV/ifp/data_validation.html, downloaded from the Internet Oct., 2003 (undated), 2 pages.

IBM Corporation, "IPF Functions", http://www2.clearlake.ibm.com/GOV/ifp/how_ifp_works.html, downloaded from the Internet Oct., 2003 (undated), 1 page.

IBM Corporation, "Systems Services", http://www2.clearlake.ibm.com/GOV/ifp/system_services.html, downloaded from the Internet Oct., 2003 (undated), 1 page.

IBM Corporation, "How IFP works>Data Output", http://www2.clearlake.ibm.com/GOV/ifp/data_output.html, downloaded from the Internet Oct., 2003 (undated), 1 page.

Arch Data Systems, Inc. "Generating Real Business Value with Teleform" http://www.cdstorage.com/imagingsolutions/Cardiff_Software.htm,© 1998-2000, last updated Nov. 7, 2002, 2 pages.

Information Access Systems, Inc. "How Does Automated Data Entry Work?" http://www.iasinc.net/formsprocessing/e-capture-works.htm, downloaded from the Internet Sep. 5, 2003 (undated), 4 pages.

TMS, Inc. "TMSSequoia and the 2000 Census", http://www.tmsinc.com/solutions/ff_at_work.html,©1999-2002, 4 pages.

CNET Networks, Inc. "Canon imageReal Capture v3", http://www.zdnet.com.au/reviews/software/buisness/story/0,2000023555,20270277-2,00.htm,© 2003, 3 pages.

Free Form Recognition, Inc. "Prosar-Aida", http://www.freeformrecognition.com/vi.htm, © 2002,, last updated Aug. 13, 2002, 2 pages.

Paradatec GmbH, "Prosar-Aida: AI-Based Document Analysis", Jan., 2002, 3 pages.

Kanai, et al. "Automated Evaluation of OCR Zoning", IEEE Transactions on Pattern Analysis and Machine Intelligence, vol. 17, No. 1, Jan. 1995, pp. 86-90.

D. E. Levine, "Not Your Sun's Microsystems", WinPlanet.com, http://www.winplanet.com/winplanet/reports/3281/1/, Apr. 27, 2001, 2 pages.

Tal Technologies, "High Resolutino Graphics" Downloaded from the Internet on Oct. 11, 2006 at http://www.taltech.com/products/dll_barcodes.html, 2 pages.

* cited by examiner

ENABLING THE USE OF MACHINE-READABLE CODES

BACKGROUND

The present application relates to digital data processing.

Machine-readable codes are physical codes that encode data in a manner that enables the data to be read quickly and accurately by a machine. Examples of machine-readable codes include bar codes and radio frequency identification (RFID) tags.

A machine-readable code is produced by encoding input data according to a symbology or encoding scheme, and then generating a physical code (i.e., a physical representation of the encoded data). The generation of a physical code can be accomplished through many different types of processes (e.g., printing the code on a substrate such as a piece of paper), and generally represents a transition of the input data from an electronic environment to a tangible environment (e.g., a paper environment). As a further example of the different processes that can be used to generate a machine-readable code, the printing process itself can involve many different types of sub-processes. For example, printing a machine-readable code can involve printing in the traditional sense of depositing ink on paper (e.g., to create a pattern of light and dark elements in a bar code). As another example, printing a machine-readable code can involve depositing conductive, semi-conductive, or non-conductive chemicals or other materials on paper or on other substrates (e.g., to create a circuit pattern in an RFID tag).

A bar code is a common example of a machine-readable code. A bar code is typically made up of a pattern of dark elements (e.g., bars) and light elements (e.g., spaces between the bars). In traditional or "linear" bar codes, the dark elements are usually vertical bars of varying width or height (hence the "bar code" terminology). In newer, two-dimensional bar codes, the dark elements can be squares, rectangles, hexagons, or other two-dimensional shapes arranged in two-dimensional patterns.

A bar code typically includes a clear margin or "quiet zone" around the bar code, a finder pattern to help identify the location and/or the ends of the bar code, a pattern of light and dark elements that represents the data encoded in the bar code, and a pattern of light and dark elements that represents one or more encoded values used for purposes of error detection and correction (e.g., checksum values). A finder pattern can be, for example, a start or stop pattern placed at the leading or trailing edge of a bar code, a bulls-eye pattern placed in the middle of a two-dimensional bar code, or some other predefined pattern placed around the perimeter of a two-dimensional bar code.

A bar code reader such as a pen reader or a laser scanner typically decodes a bar code by scanning a light source across the bar code and measuring the intensity of light reflected back from the bar code. Light is reflected from the bar code in a pattern that mirrors the arrangement of the dark and light elements. A photodiode can be used to convert the pattern of reflected light into an electrical signal, and the electrical signal can be decoded back to the original data by comparing the electrical signal to patterns of light and dark elements defined in a bar code symbology.

A symbology is an encoding scheme for a machine-readable code. Most symbologies were created to meet the needs of specific industries, and as such, they are designed to encode different types and amounts of data. Examples of traditional, linear bar code symbologies include the UPC-A and Code 39 symbologies. UPC-A (Universal Product Code-A) is a bar code symbology that is used to identify retail products. A UPC-A bar code can encode up to 12 numeric digits—a leading digit that usually represents a product type, a 10-digit UPC (Universal Product Code) assigned to the product by the Uniform Code Council, Inc., and a one digit checksum value. Code 39 is a variable length bar code symbology that can encode 44 different characters—that is, a Code 39 bar code can encode messages of different lengths (typically up to 40 characters) that are made up of the 44 allowed characters, which include numeric digits and capital letters. As an encoding example in the Code 39 symbology, the pattern "wide bar, narrow space, narrow bar, narrow space, narrow bar, wide space, narrow bar, narrow space, wide bar" is used to encode the character "A".

Examples of two-dimensional bar code symbologies include MaxiCode, Data Matrix, Aztec Code, and PDF417 (Portable Data File 417). MaxiCode is a symbology that was developed by United Parcel Service, Inc., for purposes of package identification and tracking. MaxiCode bar codes are fixed size matrixes that can represent up to 138 numeric digits or up to 93 alphanumeric characters. Data Matrix, Aztec Code, and PDF417 are high density symbologies that can generally encode several thousand bytes of any type of data (including alphanumeric characters and binary data) in a single bar code.

Although two-dimensional bar codes can encode large amounts of data, two-dimensional bar code symbologies can be complex and difficult to implement. For example, the PDF417 symbology specifies that a complete PDF417 bar code symbol is to be produced by stacking codewords on top of each other. Specifically, each PDF417 bar code is to include at least three rows, where each row is made up of a start pattern, up to 30 codewords, and a stop pattern. Each codeword must consist of a pattern of 4 bars and 4 spaces, and must be 17 modules wide. (A "module" is the narrowest allowed width of a bar or space, and each bar or space can be up to six modules wide.)

Moreover, the complete PDF417 specification, developed by Symbol Technologies, Inc., provides many user encoding options: A user can specify the module width, the height of the rows, the aspect (height to width) ratio of a complete PDF417 symbol, the level of data compaction (which allows more than one character to be encoded in a single codeword), and the level of error detection and correction (which allows undecodable or corrupted portions of a symbol to be reconstructed) that are to be used in the creation of a PDF417 symbol.

As a further example of the complexity of the PDF417 symbology, the current PDF417 specification allows the user to select one of nine different levels of error detection and correction. Higher levels allow more codewords to be recovered if the codewords are either un-scannable or mis-scanned, but they require more overhead per bar code symbol. The appropriate level of error detection and correction to use depends on various factors that can affect the legibility of a bar code, including the print contrast between the light and dark elements, the sharpness of the edges of the dark elements, the frequency and size of spots in light elements and voids in dark elements, the ability to produce elements whose dimensions are within allowed tolerances, the clarity of the quiet zones around a bar code, and the smoothness of the surface on which a bar code is located.

SUMMARY

The present invention provides methods and apparatus, including computer program products, that implement techniques for enabling the use of machine-readable codes.

In one general aspect, the techniques feature a computer program with instructions operable to receive code data generated by reading a machine-readable code, the code data including a payload, and to detect the presence of formatting information in the code data, the formatting information indicating whether the payload is in a first format or a second, distinct format. If the formatting information is not detected, or if the formatting information is detected and the formatting information indicates that the payload is in the first format, the program instructions are operable to use a first decode procedure to decode the payload. If the formatting information is detected and the formatting information indicates that the payload is in the second format, the program instructions are operable to use a second, distinct decode procedure to decode the payload.

Advantageous implementations can include one or more of the following features. The payload can include user data provided for one or more fields in an electronic document. The electronic document can have a final representation that includes the machine-readable code.

The machine-readable code can be a two-dimensional (2D) bar code or a radio frequency identification (RFID) tag.

The formatting information can contain decoding information related to the second decode procedure. The decoding information can include one or more of the following items: an identification of the second decode procedure, an identification of a product that implements the second decode procedure, a description of how to obtain a license to enable the second decode procedure, a description of how to obtain a key to enable the second decode procedure, a description of how to obtain authorization to enable the second decode procedure, and a reference to a location with additional information about the second decode procedure. The reference to the location with the additional information about the second decode procedure can be in the form of a uniform resource locator (URL) or a telephone number.

The additional information about the second decode procedure can include one or more of the following items: an identification of the product that implements the second decode procedure, a description of how to obtain the license to enable the second decode procedure, a description of how to obtain the key to enable the second decode procedure, and a reference to a second, distinct location with additional, distinct information about the second decode procedure.

The program instructions can be further operable to display the decoding information, and to use the decoding information to enable the second decode procedure.

The first format can be an open format and the second format can be a closed format. In such a scenario, the first decode procedure can include decoding the payload according to a publicly available symbology, and the second decode procedure can include decoding the payload according to a proprietary symbology, or decoding the payload to produce encrypted data and then decrypting the encrypted data.

The program instructions can be further operable to determine whether the use of the second decode procedure is authorized. Determining whether the use of the second decode procedure is authorized can include verifying the existence of a valid license or key.

In another aspect, the techniques feature a computer program product with instructions that are operable to determine whether a machine-readable code is authorized to be produced in a first format, where the machine-readable code is to be included in a final representation of an electronic document. The electronic document has one or more fields for receiving user data, and the machine-readable code is to encode the user data so that the user data can be reproduced by decoding the machine-readable code. If the machine-readable code is authorized to be produced in the first format, the program instructions are operable to set an encoding instruction to indicate to a program that can receive the user data and generate the final representation of the electronic document that the machine-readable code is to be produced in the first format. If the machine-readable code is not authorized to be produced in the first format, the program instructions are operable to set the encoding instruction to indicate that the machine-readable code is to be produced in a second, distinct format. The program instructions are additionally operable to associate the encoding instruction with the electronic document.

Advantageous implementations can include one or more of the following features. Determining whether the machine-readable code is authorized to be produced in the first format can include verifying whether a valid license or key exists.

The program instructions can be operable to secure the encoding instruction. Securing the encoding instruction can include associating a digital signature with the encoding instruction. The digital signature can be based on licensing information.

The first format can be an open format and the second format can be a closed format. The closed format can correspond to the use of a proprietary symbology or to the use of an encryption algorithm.

Associating the encoding instruction with the electronic document can include storing the encoding instruction in the electronic document, or storing the encoding instruction and a reference to the electronic document in a database or a catalog.

The encoding instruction can contain encoding information related to how to produce the machine-readable code. The encoding information can include one or more of the following items: an identification of a procedure to use to produce the machine-readable code, an identification of an encoding program to use to produce the machine-readable code, and an identification of a key to use to produce the machine-readable code.

The encoding instruction can also contain decoding information to be encoded into the machine-readable code. The decoding information can include one or more of the following items: an identification of a product that can be used to decode the machine-readable code, a description of how to obtain a license to decode the machine-readable code, a description of how to obtain a key to decode the machine-readable code, and a reference to a location with additional information about how to decode the machine-readable code.

The encoding instruction can also contain a script to be executed in order to determine whether to produce the machine-readable code in the first format or the second format, or a reference to additional information to be used to determine whether to produce the machine-readable code in the first format or the second format.

In another aspect, the techniques feature a computer program product with instructions operable to receive an electronic document having one or more fields for receiving user data to be encoded into a machine-readable code, receive user input containing the user data to be encoded into the machine-readable code, inspect an encoding instruction associated with the electronic document to determine whether to produce the machine-readable code in a first format or a second, distinct format, and produce the machine-readable code in the first format or the second format depending on the encoding instruction. The machine-readable code, which is included in a final representation of the electronic document, encodes the user data so that the user data can be reproduced by decoding the machine-readable code.

Advantageous implementations can include one or more of the following features. The machine-readable code can be a two-dimensional (2D) bar code or a radio frequency identification (RFID) tag. Producing the machine-readable code can include printing the machine-readable code.

The program instructions can be further operable to validate the encoding instruction. Validating the encoding instruction can include authenticating a digital signature associated with the encoding instruction. The encoding instruction can be stored in the electronic document or in a database. If the encoding instruction is stored in a database, inspecting the encoding instruction can include looking up the electronic document in the database.

The encoding instruction can contain encoding information related to how to produce the machine-readable code, and the program instructions can be operable to use the encoding information to determine how to produce the machine-readable code. The encoding information can include one or more of the following items: an identification of a procedure to use to produce the machine-readable code, an identification of an encoding program to use to produce the machine-readable code, and an identification of a key to use to produce the machine-readable code.

The encoding instruction can contain decoding information to be encoded into the machine-readable code, and producing the machine-readable code can include encoding the decoding information into the machine-readable code. The decoding information can include one or more of the following items: an identification of a product that can be used to decode the machine-readable code, a description of how to obtain a license to decode the machine-readable code, a description of how to obtain a key to decode the machine-readable code, and a reference to a location with additional information about how to decode the machine-readable code.

The encoding instruction can also contain a script or a reference to additional information to be used in determining whether to produce the machine-readable code in the first format or the second format, and inspecting the encoding instruction can include executing the script or inspecting the additional information.

Producing the machine-readable code can include encoding formatting information into the machine-readable code. The formatting information can indicate whether the user data in the machine-readable code is encoded in the first format or the second format.

The formatting information can also include decoding information related to how to decode the machine-readable code. The decoding information can include one or more of the following items: an identification of a product that can be used to decode the machine-readable code, a description of how to obtain a license to decode the machine-readable code, a description of how to obtain a key to decode the machine-readable code, and a reference to a location with additional information about how to decode the machine-readable code.

The first format can be an open format and the second format can be a closed format. Producing the machine-readable code in the first, open format can include encoding the user data using a publicly available symbology. Producing the machine-readable code in the second, closed format can include encoding the user data using a proprietary symbology, or encrypting the user data to produce encrypted data and then encoding the encrypted data.

In another aspect, the techniques feature a computer-implemented method that includes generating an electronic document having one or more fields for receiving user data, determining whether a machine-readable code to be included in a final representation of the electronic document is authorized to be produced in a first format or a second, distinct format, setting an encoding instruction to indicate whether the machine-readable code is authorized to be produced in the first format or the second format, and associating the encoding instruction with the electronic document. The method further includes receiving user input containing the user data, inspecting the encoding instruction associated with the electronic document to determine whether to produce the machine-readable code in the first format or the second format, and producing the machine-readable code by encoding the user data in the first format or the second format depending on the encoding instruction. The machine-readable code is included in the final representation of the electronic document. The method further includes reading the machine-readable code in the final representation of the electronic document to generate code data, determining whether the code data is in the first format or the second format, and reproducing the user data by decoding the code data according to a first decode procedure if the code data is in the first format, or according to a second, distinct decode procedure if the code data is in the second format. Decoding the code data according to the second decode procedure includes determining whether use of the second decode procedure is authorized.

The techniques described in this specification can be implemented to realize one or more of the following advantages. The techniques can be used to create an electronic form or document with one or more machine-readable code areas, where each machine-readable code area is set up to contain a bar code or other machine-readable code that encodes data from the form. The machine-readable codes can be encoded using data from the form and printed in the machine-readable code areas when a printout of the form is generated (i.e., when the electronic form is printed, thereby transferring the form from an electronic or online environment to a paper or offline environment). A machine-readable code can be used to represent all or some of the data in the form (e.g., data provided for specific fields in the form), so that the data can be reproduced by reading and decoding the machine-readable code, and automatically entered into another version of the electronic form, or into another electronic form or system.

The techniques thus enable a workflow in which bar codes or other machine-readable codes are used to represent data in forms or documents. For example, data can be filled into an electronic form, a hardcopy of the form can be printed with a bar code that encodes some or all of the data in the form, and the bar code can be scanned to recover the data so that the data can be transferred into another electronic form or system. The use of machine-readable codes in this manner—i.e., the use of machine-readable codes to maintain a representation of data in a paper environment—makes it easy to feed such data back into an electronic environment. Consequently, by enabling such a workflow, the techniques permit data to be transferred quickly, easily, and accurately between paper and electronic environments.

A company that develops an infrastructure to support a workflow in which machine-readable codes are used in the manner described above thus provides a significant benefit to the parties that participate in the workflow. Providing such an infrastructure can require significant effort, however, especially if the infrastructure supports multiple symbologies (including, for example, complex bar code symbologies that can be used to create high-density, two-dimensional bar codes). Accordingly, a company that develops such an infrastructure can use the techniques described in this specification to limit access to the infrastructure—that is, the techniques can be used to allow only licensed or otherwise authorized parties to make use of the infrastructure.

Moreover, the techniques can be used to allow different parties in the workflow to obtain the requisite license or authority to use the infrastructure. In particular, the techniques can be used to provide an infrastructure that simultaneously supports multiple business models. For example, in a first model, a form author or publisher obtains a license to enable the use of machine-readable codes. Such a license allows the publisher to create and publish forms with machine-readable codes that are encoded using an open format (i.e., a format that can be decoded by any third party).

In a second model, a form processor (the party that reads and decodes the machine-readable codes) obtains a license to decode the machine-readable codes. Because the publisher does not obtain a license when this model is being used, the forms created by the publisher include machine-readable codes that are encoded using a closed or proprietary format. To properly decode such machine-readable codes, the form processor must obtain and use appropriate decoding technology (e.g., decoding software licensed from the provider of the infrastructure).

The two example business models specified above can co-exist in one system or infrastructure, so that an authorization mechanism (and therefore a charging mechanism) can be enforced at two different places in the workflow—either at form authoring (e.g., when a publisher creates or publishes a form), or at form processing (e.g., when a processor decodes a machine-readable code). The dual, co-existing business models allow a form author to choose between the two models, and in so doing, to decide which way is the best way to obtain authorization for and to enable the use of machine-readable codes for the particular circumstances in which the form that is being created will be used. For example, one model may be more appropriate for a closed loop workflow (where one organization both publishes and processes a form) than for an open loop workflow (where the organization that publishes the form is different from the organization that processes the form), though either model can be used with either type of workflow.

Other business models can also be implemented. For example, the two business models specified above can be combined, so that an authorization/charging mechanism is enforced at both the form authoring and form processing ends of the workflow. By enabling multiple business models to be used to authorize the use of machine-readable codes, the techniques provide flexibility in the manner of charging for the use of machine-readable codes in a multi-party workflow. Moreover, in some implementations, the techniques also allow a chosen business model to be changed without impacting the workflow.

Licensing or authorization information regarding the use of machine-readable codes can be incorporated directly into an electronic form or document. For example, an attribute can be set to reflect which model has been chosen, and stored directly in an electronic form. Such information can be used by a client program or application—e.g., an application that can display a representation of the form and receive user data corresponding to the fields in the form—to determine how to encode such data into a machine-readable code during the transition from the electronic environment to the paper environment (e.g., when the form is printed).

In other words, an attribute can be set on the publisher side of the workflow (based on the model chosen by the publisher, as manifested, for example, by licensing information) to indicate how a client program should handle the encoding of a machine-readable code, which in turn dictates how the processor must handle the decoding of the machine-readable code. In addition, because the attribute can represent (and incorporate) actual licensing or authorization information, the attribute can be secured, so that the client program can determine whether the attribute was legitimately set.

Not only can the techniques described in this specification allow two business models to co-exist in one system, but they can also provide an additional, important advantage: The particular model chosen by a form author need not have any impact—indeed, need not be known—by the users of the form (i.e., the parties providing data for and printing out the form). As indicated above, the disclosed techniques specify that information that reflects the model chosen by a form author can be stored directly in a document. Such information can be automatically interpreted by a client program and used to determine how to encode a machine-readable code in the document. The party filling in the form need not know which model is being used or how the machine-readable code is being encoded or decoded. The techniques thus make possible a machine-readable code workflow that supports two models (e.g., models that allow either the form author or the form processor to pay to enable the use of machine-readable codes) in a manner that permits either model to be chosen and used without any impact on the people filling in the form.

Although the description in this specification focuses on bar codes, the description is provided by way of example only, and it is to be understood that the techniques of the present invention are applicable to and can be used with other types of machine-readable codes.

These general and specific aspects can be implemented using a computer program, a method, a system or apparatus, or any combination of computer programs, methods, or systems. The details of one or more implementations of the invention are set forth in the accompanying drawings and in the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
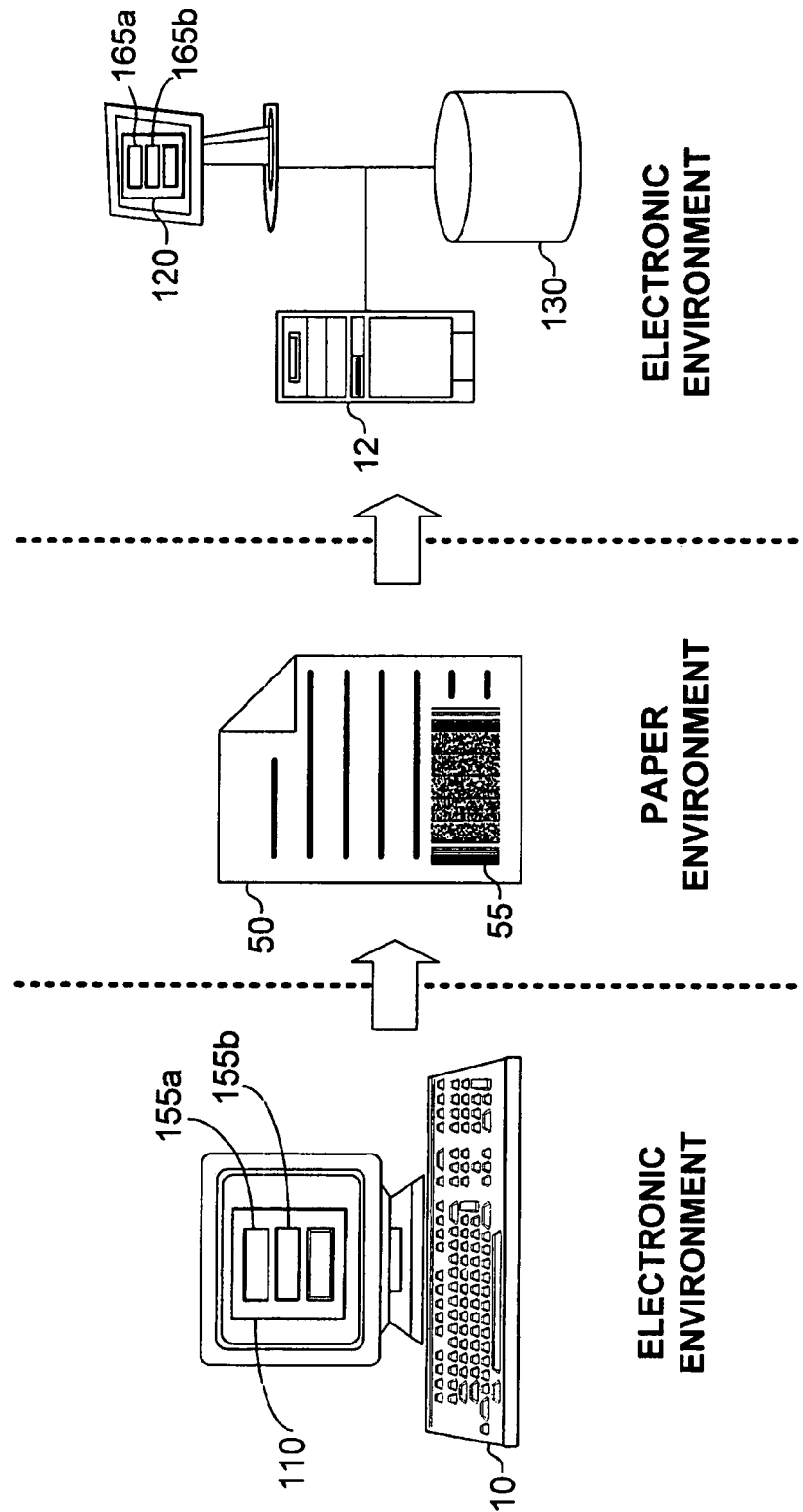
FIG. 1 illustrates a workflow that uses forms with bar codes.

Traditionally, bar codes and other machine-readable codes have been used to identify objects. For example, a ten digit UPC code assigned to a product can be encoded into a UPC-A bar code and printed on a label affixed to the product. The UPC-A bar code can then be scanned and decoded, e.g., at a cash register, in order to read the product's UPC code and thereby identify the product. The decoded UPC code can then be used in various ways—e.g., the UPC code can be used to look up the price of the product in a database, or to update an inventory level for the product.

Machine-readable codes can also be used on forms or documents. Rather than using a machine-readable code to encode something about a form (e.g., an identification of the form), however, a machine-readable code can also be used to encode data contained in the form, so that such data can be reproduced by reading and decoding the machine-readable code. For example, two-dimensional (2D) bar codes can be used to represent data or metadata for "fill-in and print" forms (forms that are generated and filled in electronically and then printed to paper). Using 2D bar codes on such forms allows the recipients of the paper forms to extract data or structured content from the forms automatically by using either a standard document scanner in conjunction with a 2D bar code decoder, or a 2D bar code wand scanner.

Machine-readable codes used in this manner provide a quick and accurate means for entering data into a target system, such as an application running on a computer, or a database (a collection of information organized in a manner that facilitates access to the information, including searches for, updates to, and management of the information). More specifically, the data to be entered into the target system—e.g., the data that is filled into a form—can be encoded into a machine-readable code and printed on the form. At a later time, the machine-readable code can be read and decoded in order to reproduce the data, and the reproduced data can be entered into the target system (either directly or after further processing). The use of machine-readable codes in this manner reduces the potential for errors from unreliable modes of data entry, such as manual data entry or optical character recognition (OCR). However, it is important to make sure that machine-readable codes used in this manner work properly (i.e., that the machine-readable codes are valid and decodable), since such machine-readable codes potentially represent a significant amount of data (e.g., all the fields in a form), rather than a small amount of information, such as an identification of the form.

To ensure that machine-readable codes work properly, an infrastructure must be implemented to effect the proper encoding, production, and decoding of the machine-readable codes. Because implementing such an infrastructure can require significant effort (especially if the infrastructure supports multiple or complex symbologies), a company or organization that develops such an infrastructure may want to limit access to the infrastructure to authorized parties (e.g., to parties that have purchased a license to use the infrastructure). The techniques set forth in this specification can be used to restrict access to a machine-readable code infrastructure, as discussed in more detail below.

FIG. 1 illustrates an example of a workflow that uses documents with bar codes in the manner specified above. As shown in FIG. 1, a computer system 10 can be used to collect data. The data can be collected by means of an electronic form or document 110 into which a user inputs the data, or by other means such as a database management system or an application that queries the user for the data or retrieves the data from an appropriate source. The electronic document 110 can include multiple fields 155a, 155b that can be used to collect the data—for example, fields 155a and 155b can be used to collect the first name and last name of a person.

After the data has been collected, the workflow depicted in FIG. 1 subsequently requires the data or portions of the data to move from an electronic environment to a paper environment. For example, the data may represent data about a patient that was collected in an electronic document 110 at a first hospital. If the patient is transferred to a second hospital, the data about the patient may need to be transferred with the patient. In this example, the data can be transferred by printing out a hardcopy of the electronic document 110 and sending the hardcopy along with the patient. The printout 50 of the electronic document 110 can include a representation of the data that was collected in the electronic environment. Some of the data can be represented conventionally—i.e., by printing out the data directly. However, some of the data can also be represented by a bar code 55 displayed in the printout 50. That is, some (or all) of the data that was collected in the electronic environment can be encoded into a bar code 55, and the bar code 55 can be displayed in a section of the printout 50.

At a later point in time, the data or portions of the data may need to move from a paper environment back into an electronic environment. Continuing with the hospital example, when the patient arrives at the second hospital, the patient data may need to be entered into a computer system 12 at the second hospital. The computer system 12 can include an application 120 or a database 130 that is used to store the patient data. Some of the data from the printout 50 can be manually entered into the computer system 12—e.g., by an operator who reads the printout 50 and manually re-enters the data into multiple fields 165a, 165b in the application 120.

In contrast, the data that was encoded into the bar code 55 does not need to be re-entered manually. Instead, the data can be produced by using a bar code reader to scan and decode the bar code 55. Such data can then be transferred (either directly or after further processing, e.g., to change the format of the data) into the appropriate fields in the application 120 or into another target system (e.g., the database 130).

The use of machine-readable codes to encode some (or all) of the data in an electronic document facilitates a workflow such as the workflow shown in FIG. 1, where data may be transferred repeatedly from an electronic environment (e.g., an electronic form) to a paper environment (e.g., a printout of the electronic form), and back again to an electronic environment (e.g., an electronic form that may be the same form as the first electronic form, or a different form than the first electronic form). The use of machine-readable codes in such a workflow makes the transfer of data quick and accurate, as the data does not need to be re-entered manually every time the workflow requires a transition from a paper environment to an electronic environment. This can be particularly significant for critical data—e.g., in the hospital example, the bar code 55 can be used to encode allergy, drug, and dosage information for the patient, so as to minimize the chance that such information will be entered incorrectly in the computer system of the second hospital.

Figure 2:
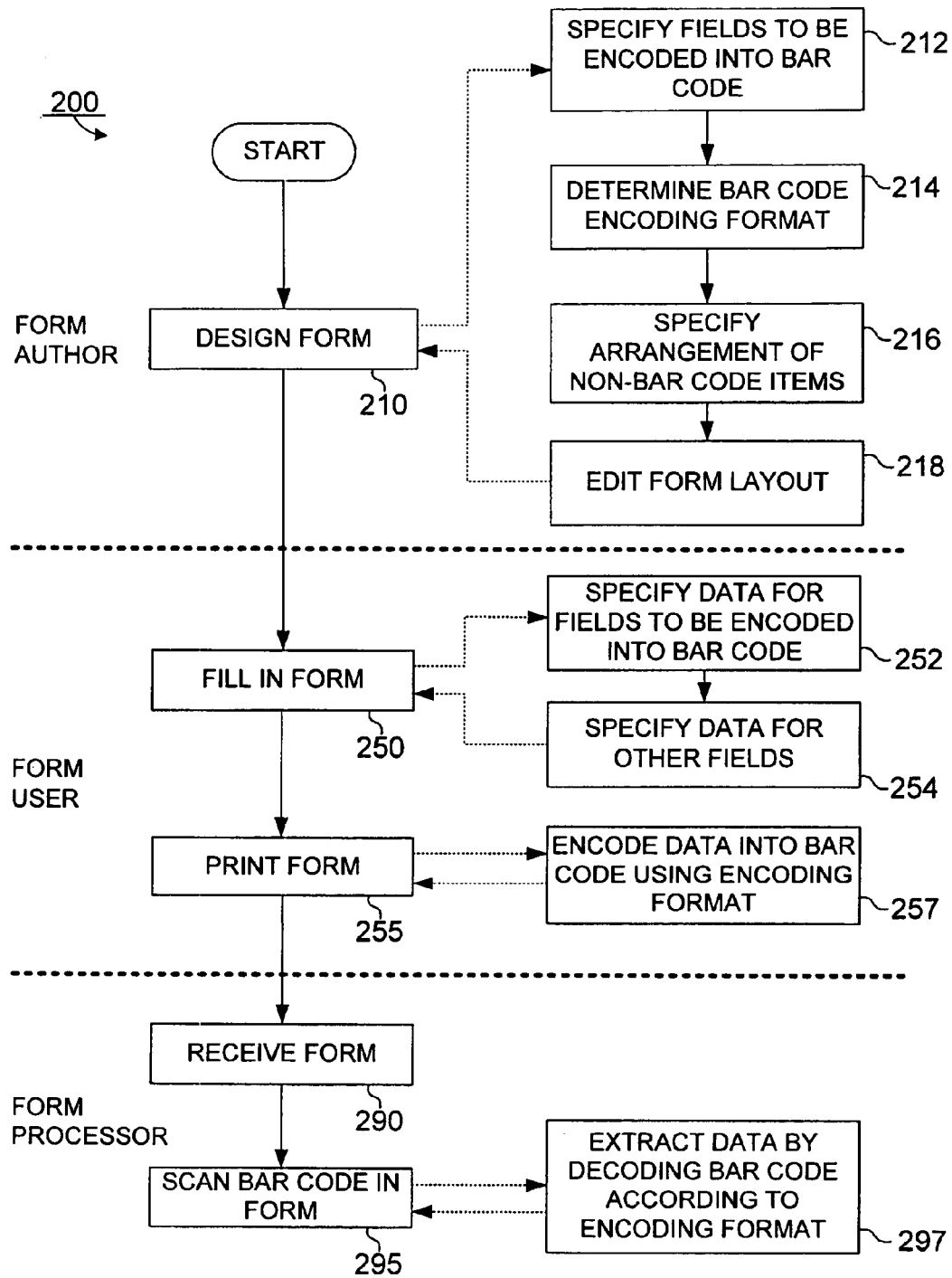
FIG. 2 is a flowchart illustrating a process that implements the workflow of FIG. 1.

FIG. 2 illustrates an example process 200 that implements the workflow shown in FIG. 1. As shown by the dashed lines in FIG. 2, the process 200 is divided into three parts, corresponding to three different parties—a form author (who creates an electronic form), a form user (who provides data for and prints out the form), and a form processor (who extracts data from the form and transfers the data into another electronic system). Each part of the process 200 can be implemented by a different program—e.g., the form author can use a form authoring program to create an electronic form, the form user can use a client program to fill in and print out the form, and the form processor can use a decoding program to decode the machine-readable code on the print version of the form.

In the first part of the process 200, a form author designs a form in which some of the data from the form is to be encoded into a bar code or other machine-readable code on the form (210). To create such a form, the form author can specify the fields from the form that are to be encoded into the bar code (212), as well as additional information about the bar code to be produced. Such information can include, for example, the type of bar code (e.g., the symbology to be used in creating the bar code), and the position and size of a bar code area, which indicates where on the form the bar code is to be printed and what the dimensions of the bar code are to be. The form author can also specify an arrangement of non-bar code items (216). For example, the form author can lay out the fields to be included in the form, as well as other items such as text (e.g., instructions for filling out the form), and graphics. The form author can then edit the form layout (218), e.g., by moving or re-sizing the bar code area or the other objects in the form, or by modifying various information in or about the form (e.g., the page size and orientation, the background color, etc.) In general, the form author can modify the form in any manner that is customarily used to create and edit forms or documents.

As part of the form authoring process, the form authoring program can determine an encoding format for the bar code to be displayed on the form (214). In one implementation of the process 200, the encoding format can be either an "open" format or a "closed" format, corresponding to two different business models. If the form author obtains authority (e.g., by purchasing a license) to publish forms with open bar codes, than an open encoding format is used. An open encoding format is a format that allows any form processor to decode the machine-readable code. For example, a bar code can be encoded in an open format by using any publicly available bar code symbology. Such a bar code can be read by any bar code reader capable of decoding the chosen symbology.

If, on the other hand, the form author does not obtain authority to publish forms with open bar codes, a closed encoding format is used. A closed encoding format is a proprietary format that requires a form processor to use a special procedure (not known to the general public) to decode the machine-readable code. The form processor can be required to obtain authority to use the special procedure—e.g., by purchasing licensed software that implements the special procedure. In this case, a closed encoding format is a format that only allows an authorized form processor to decode the machine-readable code.

The second and third parts of the process 200 illustrate use of the form created by the form author. The second part of the process 200 involves use of the form in an electronic environment. A data provider first fills in the form (250), e.g., by using a client program to display the form and typing data into the various fields included in the form. In so doing, the data provider can specify data for the fields that are to be encoded into the bar code (252), as well as for other fields in the form (254).

The data provider can then print out the form (255). When the form is printed, some of the data that was entered into the form may be printed directly on the paper form (e.g., the data may be printed exactly as it was entered). In addition, the bar code input data—i.e., the data that was entered into the fields that are associated with the bar code—is encoded into the bar code using the previously determined encoding format (257), and the bar code that is generated as a result of the encoding process is displayed on the form in the bar code area that was specified by the form author. In some implementations, the bar code input data can also be printed directly on the form, so that such data can be read by a human as well as by a bar code reader.

The printing of the form represents a transition in the workflow from an electronic environment to a paper or other tangible environment. As discussed previously, printing the form, including the printing of the machine-readable code on the form, can involve many different processes (e.g., depositing ink on paper to create a pattern of light and dark elements in a bar code, or depositing conductive, semiconductive, or non-conductive materials on a substrate to create a circuit pattern in an RFID tag).

Once a print or tangible version of a form has been generated, the form can be used as any other form would be used. For example, data may be read from the form and used as necessary. Data may also be added to the form (e.g., by writing values in blank fields, checking boxes, and so forth).

The workflow may eventually require the data on the form to be transferred back into an electronic environment. The machine-readable code on the form facilitates the transition to the electronic environment. After a form processor has received the print version of the form (290), the form processor can scan (295) and decode (297) the bar code in order to extract the data that was encoded into the bar code. The decode procedure must correspond to the procedure that was used to encode the bar code. Thus, if a special procedure was used to encode the bar code in a closed format, the special procedure must be reversed to decode the bar code. For example, if input data was encrypted before being encoded into the bar code, the data generated by a bar code reader must be decrypted in order to reproduce the input data. As another example, if the input data was encoded into a bar code using a proprietary symbology, the same proprietary symbology must be used to decode the bar code.

The data extracted from the machine-readable code can then be processed (e.g., to change the format of the data), and transmitted to the destination electronic environment. For example, the data can be transmitted to a database or to an application running on a computer. The database or application can include input fields into which the data can be entered. For instance, an application can display an electronic form containing the input fields, and the data can be entered into the appropriate input fields in the form. Where the electronic form is another instance of the original electronic form, the form itself can be thought of as re-entering an electronic environment.

The second and third parts of the process 200 can be repeated as necessary. For example, the data in the electronic form can be modified or added to, and the form can be printed out, again including a machine-readable code that represents some or all of the data in the form. The machine-readable code can subsequently be read and decoded in order to re-enter the data into an electronic environment (e.g., into another instance of the electronic form). In this manner, the process 200 enables a roundtrip form workflow, where a form can transition repeatedly between the electronic and paper domains. The workflow can also include alternative paths, such as transfer of the data from a machine-readable code to a destination other than a form (e.g., a database).

The open and closed encoding formats provide different ways to enforce a charging mechanism for use of the machine-readable code infrastructure that enables the workflow implemented by the process 200. A charging mechanism can be enforced at different points (and against different parties) in the workflow—for example, a form author can be charged upon creating or publishing a form with a machine-readable code, or a form processor can be charged upon decoding a machine-readable code on a form. The open and closed encoding formats can thus be used to implement different business models—e.g., in the example above, charging a form author represents one business model, and charging a form processor represents a second business model. These two business models are explained in more detail below.

In the first model, a form author can purchase a license that allows the form author to create and publish a form that is enabled with a right. The right allows a machine-readable code to be produced in an open format when the form is printed, so that a form processor can decode the machine-readable code using any third-party system (and without the need to purchase a license from the provider of the infrastructure).

In the second model, the form author does not purchase a license, and consequently the form that is published by the form author is not enabled with the right to produce a machine-readable code in an open format. As a result, the client program that is used to print the form produces a machine-readable code in a closed format, and the form processor may be required to purchase a license in order to be able to decode the machine-readable code.

The right to produce machine-readable codes in an open format—a right that can be set by a form authoring application, stored in an electronic document, and used by a client program to determine how to encode a machine-readable code to be included in a print version of the electronic document—thus creates a way in which multiple business models (i.e., the models represented by the different ways in which the right can be set) can co-exist in one infrastructure or system.

Figure 3:
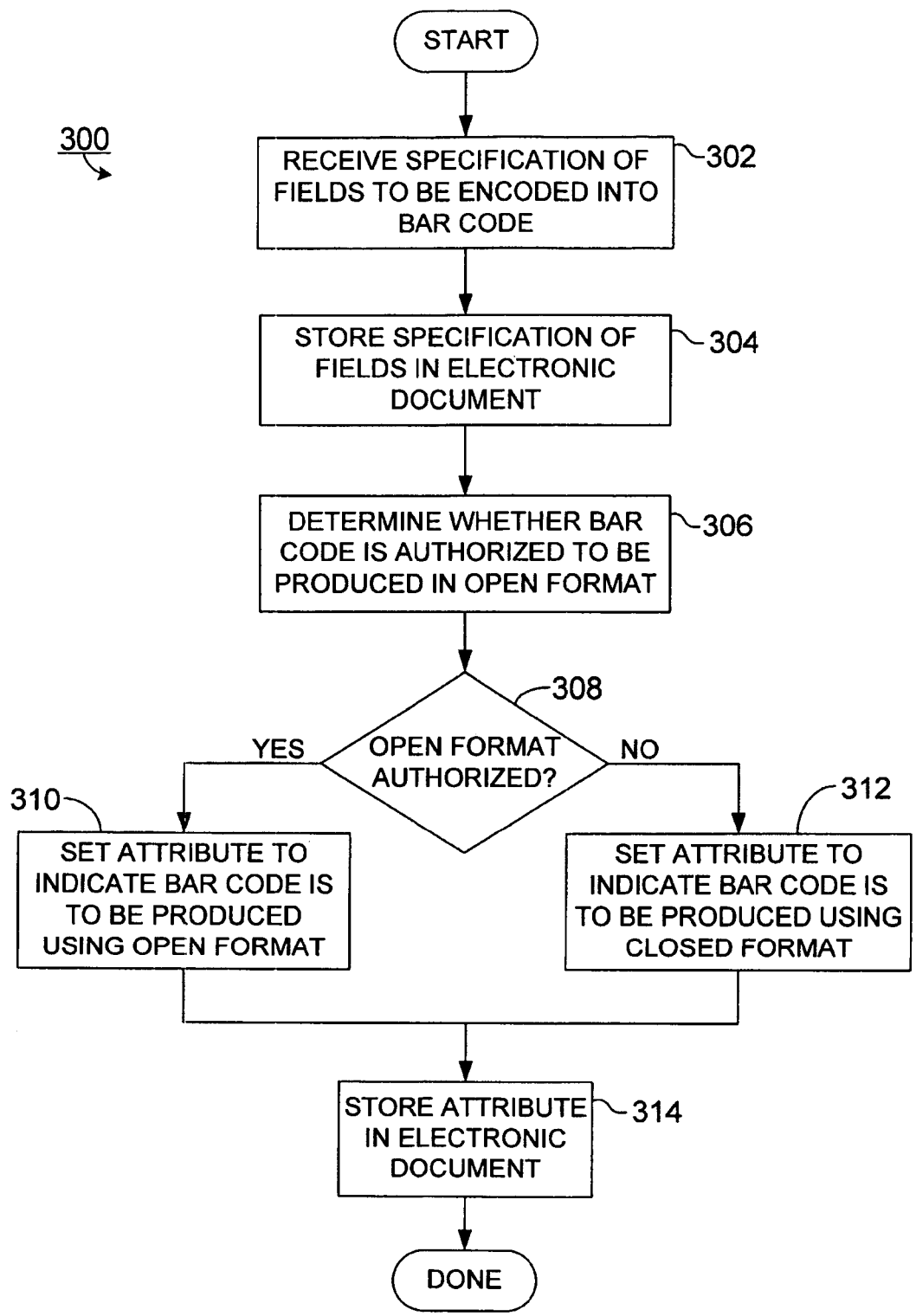
FIG. 3 is a flowchart illustrating a process for authoring an electronic form with a bar code.

FIG. 3 illustrates an example process 300 for authoring a form that is to include one or more machine-readable codes. The process 300 can be performed as part of the process 200—e.g., in the portion 210 of the process 200 where the form author designs a form.

The process 300 can be implemented by a form authoring application that is designed to help a user (e.g., a form author) create a form that is to include a bar code or other machine-readable code. (The form can include more than one bar code, but the same process can be used to create each bar code—hence, for purposes of simplicity, the discussion below assumes that the form is to include only one bar code.)

The form authoring application can be used to generate the electronic form, e.g., by specifying a form layout and one or more fields to be included in the form. The application can display a list of the fields in the form, and the user can specify which of those fields are to be encoded into the bar code (e.g., by selecting one or more fields from the displayed list of fields). The application can receive the specification of the fields to be encoded into the bar code (302), and store that specification in the electronic form (e.g., by storing a marker that identifies the selected fields) (304).

The application can then determine whether the bar code is authorized to be produced in an open encoding format (306). In one implementation, the application makes such a determination by checking licensing information to determine whether the form author has obtained a valid license to publish forms with open bar codes. By default, the application can assume that the bar code is not authorized to be produced in an open encoding format, unless the application can verify that a valid license to produce open bar codes does in fact exist.

The application then sets an attribute to indicate the format in which the bar code is to be encoded (e.g., to indicate whether an open or a closed format is to be used). If the open encoding format is authorized ("yes" branch of decision 308), the attribute is set to indicate that the bar code is to be produced using the open encoding format (310). If the open encoding format is not authorized ("no" branch of decision 308), the attribute is set to indicate that the bar code is to be produced using a closed encoding format (312). The attribute can thus be thought of as a right that allows a bar code to be created in an open format that is decodable by anybody—if the form author has a valid license, the right is enabled, otherwise, the right is disabled.

The application can then store the attribute in the electronic form (314), thereby allowing the form itself to carry information about whether the open encoding format has been enabled for the form. The attribute can thus serve as a way to incorporate licensing information (e.g., information regarding the form author's license to create forms that use open format bar codes) directly into a form.

The attribute can also be secured in order to prevent others from tampering with it. For example, the attribute can be encrypted and signed with a digital signature that is also stored in the form. In one implementation, the digital signature is based on the form author's license or on other licensing information.

Figure 4:
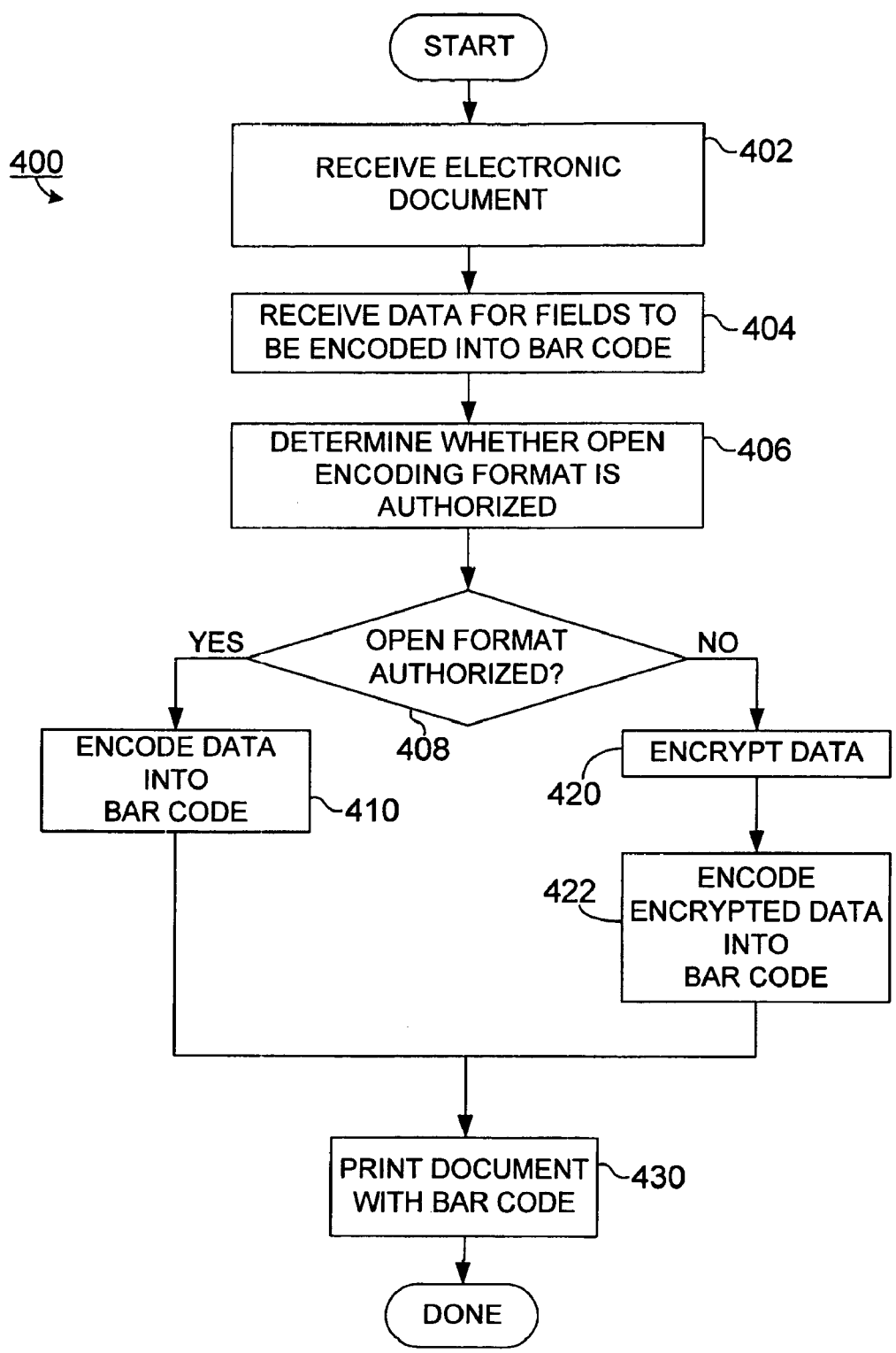
FIG. 4 is a flowchart illustrating a process for generating a print version of the electronic form created by the process of FIG. 3.

FIG. 4 illustrates an example process 400 for using an electronic form such as the one created by the process 300. The process 400 can be implemented by a client application that corresponds to the form authoring application used to create an electronic form. An example of a client application is Adobe Reader, which can be used to work with electronic forms using Adobe's Portable Document Format (PDF).

A client application can receive an electronic form (402), and display a representation of the electronic form to a form user. The display can include input fields corresponding to the fields in the electronic form, through which the user can provide data (i.e., through which the user can fill in the form). The client application can receive such data, including data provided for the fields that are to be encoded into the bar code (404).

The client application can then determine what encoding format to use to encode the data into the bar code. In one implementation, the client application makes that determination by checking the attribute stored in the form to verify whether an open encoding format is authorized (406). If the form includes security information, the application can also check the security information to ascertain that the attribute has been legitimately set—for example, the application can authenticate a digital signature to validate the attribute.

If the attribute indicates that the open encoding format is authorized ("yes" branch of decision 408), the application then generates the bar code using the open encoding format. For example, the application can encode the data into the bar code according to a publicly available symbology (e.g., the PDF417 symbology) (410). Such a bar code can then be decoded by any software or product capable of decoding bar codes that use that symbology (e.g., any PDF417 bar code reader or decoder).

If the attribute indicates that the open encoding format is not authorized ("no" branch of decision 408), the application then generates the bar code using a closed encoding format.

As discussed previously, a closed encoding format is a proprietary format that requires use of a special or proprietary decoding procedure. In one implementation, the application generates the bar code in a closed format by encoding the data using a proprietary symbology. The bar code must then be decoded by a bar code reader or a program (e.g., decoding software licensed from the provider of the infrastructure) that is capable of decoding that proprietary symbology.

In another implementation, the application uses a publicly available symbology (e.g., the PDF417 symbology), but generates the bar code in a closed format by encrypting the form data (420) before encoding it into the bar code (422). Such a bar code can be decoded by any software or product capable of decoding bar codes that use the publicly available symbology, but the decoded data will be encrypted, and thus needs to be decrypted (e.g., by decryption software licensed from the provider of the infrastructure) in order to extract the form data from the bar code.

Finally, the application generates a print version of the electronic form (430). As explained previously, printing the form is the process of generating a tangible representation of the form (e.g., a paper form). The tangible representation of the form includes the machine-readable code that encodes the form data—for example, the application can generate and print a bar code or an RFID tag on a paper form.

Figure 5:
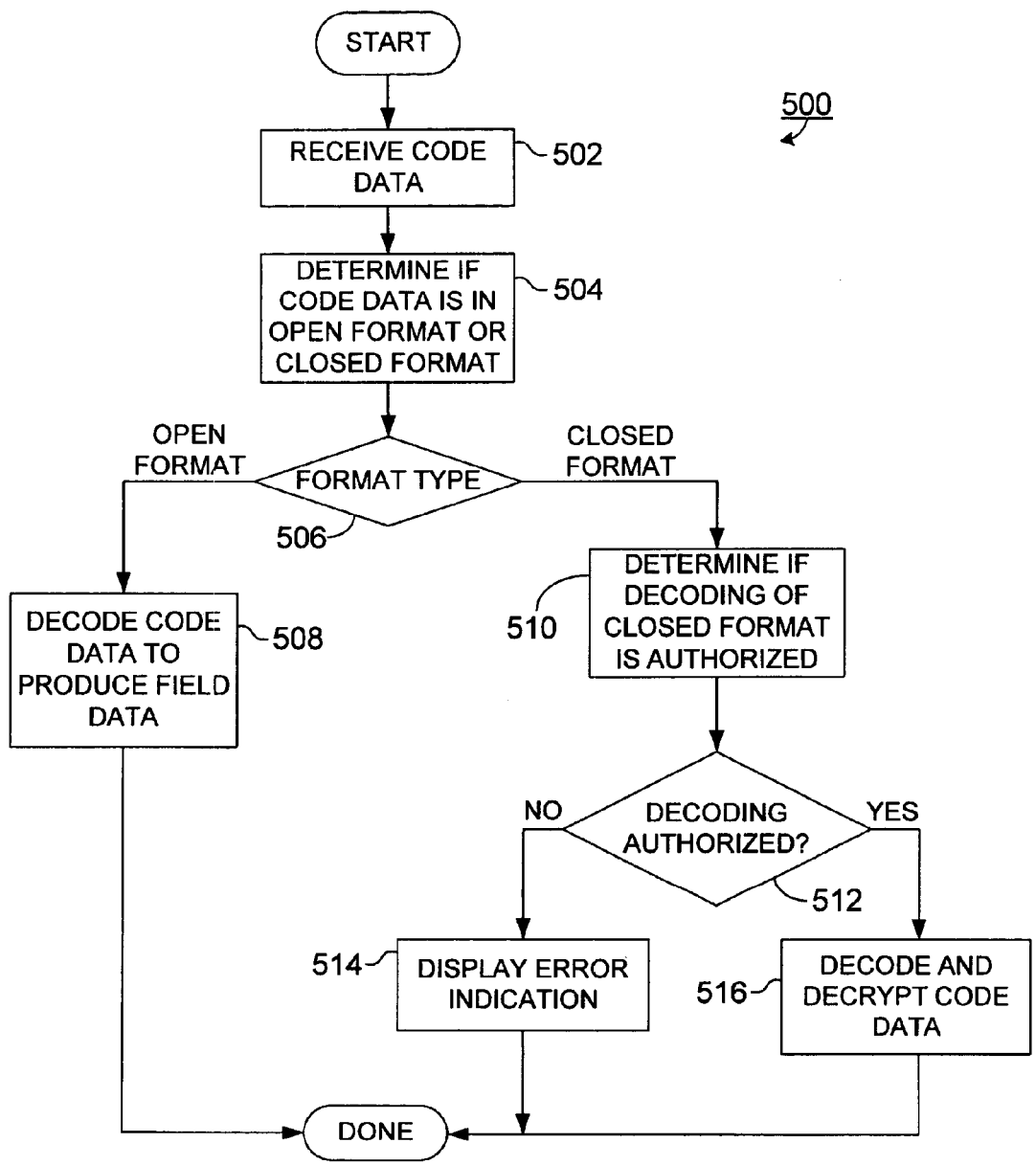
FIG. 5 is a flowchart illustrating a process for decoding the bar code in the print version of the electronic form generated by the process of FIG. 4.

The print version of the form can then be processed by a form processor. To extract the form data, the form processor can read and decode the machine-readable code on the form. FIG. 5 illustrates an example process 500 that can be used by a form processor to decode a machine-readable code. The process 500 can be implemented by a program or application used by the form processor (e.g., as part of a bar code reader, or on a computer used to process the form).

To decode a bar code or other machine-readable code, the program first receives the code data generated by reading the bar code on a form (e.g., with a scanner) (502). The program then determines the format of the code data. In one implementation, the program checks formatting information (e.g., header bits in the code data) to determine whether the rest of the code data (i.e., the code data following the formatting information) is in an open or closed format (corresponding to whether the bar code was produced using an open or closed format) (504). The program can then use different procedures to decode the code data and extract the form data, depending on the format of the code data.

For example, if the code data is in an open format ("open format" branch of decision 506), the program can use a first decode procedure to decode the code data. In one implementation, a bar code in an open format is simply a bar code that was encoded using a publicly available symbology. In this implementation, the first decode procedure can simply include decoding the code data according to that symbology (508). Decoding the code data reproduces the form data (e.g., the data filled in by the form user), and the form processor can then transfer that data into an electronic system (e.g., an application or a database).

If the code data is in a closed format ("closed format" branch of decision 506), the program can use a second decode procedure to decode the code data. The second decode procedure can be a proprietary decode procedure that generally does the opposite actions of the procedure used to produce the bar code in the closed format. For example, if the bar code in the closed format was generated by encrypting the form data and encoding the encrypted data, the second decode procedure can include decoding the code data and then decrypting the decoded data (516). As a second example, if the bar code in the closed format is a bar code that was encoded using a proprietary symbology, the second decode procedure can include decoding the bar code according to the proprietary symbology.

In one implementation, before the program executes the second decode procedure, the program verifies whether execution of that procedure is authorized—i.e., the program determines whether the user is authorized to decode closed format bar codes (510). If the user is authorized to decode closed format bar codes ("yes" branch of decision 512), the program can execute the second decode procedure; otherwise ("no" branch of decision 512), the program can display an error indication (514).

The program can determine whether the user is authorized to decode closed format bar codes by, for example, checking to see whether the user has a valid license to execute the proprietary decode procedure. In some implementations, the program can combine the operations of checking to see whether the user is authorized to decode closed format bar codes and executing the proprietary decode procedure. For example, if the proprietary decode procedure includes a decryption algorithm that requires a decryption key, the provision of a valid decryption key can serve both to validate the authority of the user to execute the decode procedure and to activate the decryption algorithm in order to reproduce the form data.

Many variations of the above techniques are possible and fall within the scope of the invention. For example, a form authoring application can set and use a more complex encoding instruction rather than a simple attribute to specify the format in which a machine-readable code should be produced. The encoding instruction can include encoding information, which can be used by a client application to determine how to encode a machine-readable code. The encoding information can include, for example, an identification of a procedure, an encoding program, or a key that can be used to produce the machine-readable code. Multiple encoding procedures, programs, or keys can be specified, resulting in multiple formats (including multiple open and multiple closed formats) for the machine-readable code. The encoding instruction can also include a script that the client application can execute in order to determine the format in which to produce a machine-readable code, or additional information that the client program can check in order to make that determination. The additional information can be arranged hierarchically or cascaded, so that input from multiple sources or parties is used to determine the format in which to produce a machine-readable code.

In addition, multiple mechanisms can be employed to set, distribute, and use the right to produce machine-readable codes in a specified format. Examples of such mechanisms are provided in U.S. patent application Ser. No. 10/080,923, which was filed on Feb. 21, 2002, and which is entitled "Application Rights Enabling." The disclosure of that Patent Application, which discusses methods for enabling and controlling general functions and capabilities in software applications, is incorporated herein by reference in its entirety.

As one example of such a mechanism, rather than storing an encoding instruction in an electronic document, the encoding instruction can be distributed by storing the encoding instruction in a catalog or database. A client application can then look up the electronic document in the catalog or database in order to find the corresponding encoding instruction. Many other techniques can also be used to associate an encoding instruction with an electronic document.

Corresponding variations can be made to a client program or application that is used to generate machine-readable codes. For example, a client application can check an encoding instruction to determine which one of multiple formats (including multiple open and closed formats) to use in encoding a machine-readable code. The client application can also check encoding information or execute a script included as part of an encoding instruction associated with an electronic document in order to determine whether (and how) to encode a machine-readable code in a particular format.

When generating a machine-readable code, the client application can encode not only user data provided in an electronic document, but also formatting information that indicates the format in which the user data is encoded (e.g., an open or a closed format, or a specifically-identified format). The formatting information, which can be encoded in a different format than the user data, can also include decoding information that can be used by a form processor to determine how to decode the user data.

The decoding information can include an identification of a product that can be used to decode the machine-readable code, a description of how to obtain a license or a key to decode the machine-readable code, or a reference to a location with additional information about how to decode the machine-readable code. In this manner, the machine-readable code generated by the client application can itself provide information about how to properly decode the machine-readable code and extract the user data from the machine-readable code. (Alternatively, as indicated above, the machine-readable code can provide instructions about where to obtain such information.) The decoding information, or portions of the decoding information, can be specified as part of the encoding information that is associated with an electronic document.

Additional enhancements are also possible. For example, if an encoding instruction is secured (e.g., with a digital signature), the client application can validate the encoding instruction to make sure that the instruction has been set legitimately (e.g., by authenticating the digital signature). The client application can use various default actions (e.g., always encoding a machine-readable code in a closed encoding format) if the encoding instruction is not accessible or cannot be validated.

Corresponding variations can also be made from the perspective of a program or process used by a form processor. For example, the program used by a form processor to decode a machine-readable code can attempt to detect formatting information in the code data generated by reading the machine-readable code. If formatting information is not detected, or if formatting information is detected and the information indicates that the machine-readable code is in an open format, the program can use an open decoding procedure to decode the payload (i.e., the user data encoded into the machine-readable code). In one implementation, the entire machine-readable code is decoded using an open decode procedure, so that if no formatting information is detected, the program need not do anything else—it can simply assume that the rest of the data, including the payload, was validly decoded. In another implementation, the machine-readable code is decoded in sections, meaning that the program detects and checks formatting information before decoding the payload. If the program detects formatting information and the formatting information indicates that the machine-readable code is in a closed format, the program can use a closed or proprietary decoding procedure to decode the payload.

The formatting information can also include a specification of the format in which the payload is encoded, and decoding information that can be used to determine how to decode the machine-readable code. In one implementation, the decoding information includes information related to a closed decoding procedure. For example, the decoding information can include an identification of a closed decoding procedure, an identification of a product that implements the closed decoding procedure, or a description of how to obtain a license, a key, or other authorization to enable use of the closed decoding procedure. The decoding information can also include a reference to a location with additional information about the closed decoding procedure, such as a link (e.g., a Uniform Resource Locator) to a web site with the additional information, or a telephone number that the form processor can call in order to obtain information about how to enable the closed decoding procedure. The additional information can be arranged hierarchically or cascaded, so that information from multiple sources or parties can be used to determine how to enable use of the closed decoding procedure. Similarly, the closed decoding procedure itself can involve use of multiple cascaded sub-procedures, each of which can require separate enablement or authorization.

The same techniques can be used with all machine-readable code formats. That is, a machine-readable code can encode information about the format in which a payload is encoded, as well as about how to decode the payload or where to obtain information about decoding the payload.

As used in this specification, the terms "electronic document" and "electronic form" mean a set of electronic data, including both electronic data stored in a file and electronic data received over a network. An electronic document or form does not necessarily correspond to a file. A document or form may be stored in a portion of a file that holds other documents or forms, in a single file dedicated to the document or form in question, or in a set of coordinated files.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIG. 3 does not require the particular order shown, or sequential order, to achieve desirable results (e.g., the operation to determine whether a bar code is authorized to be produced in an open format can be performed at multiple places within the overall process). In certain implementations, multitasking and parallel processing may be preferable. Other embodiments are within the scope of the following claims.

What is claimed is:

1. A computer program product, stored on a machine-readable medium, the computer program product comprising instructions operable to cause a data processing apparatus to:
    receive code data generated by reading a machine-readable code, the code data comprising a payload;
    detect the presence of formatting information (FI) in the code data, the FI indicating whether the payload is in a first format or a second, distinct format, where the first format is an open format and the second format is a closed format;
    if the FI is not detected, or if the FI is detected and the FI indicates that the payload is in the first format, use a first decode procedure to decode the payload; and
    if the FI is detected and the FI indicates that the payload is in the second format, use a second, distinct decode procedure to decode the payload.

2. The computer program product of claim 1, wherein the payload comprises user data provided for one or more fields in an electronic document, the electronic document having a final representation that includes the machine-readable code.

3. The computer program product of claim 1, wherein the machine-readable code is a two-dimensional (2D) bar code.

4. The computer program product of claim 1, wherein the machine-readable code is a radio frequency identification (RFID) tag.

5. The computer program product of claim 1, wherein the FI comprises decoding information related to the second decode procedure.

6. The computer program product of claim 5, wherein the decoding information includes one or more of:
    an identification of the second decode procedure;
    an identification of a product that implements the second decode procedure;
    a description of how to obtain a license to enable the second decode procedure;
    a description of how to obtain a key to enable the second decode procedure;
    a description of how to obtain authorization to enable the second decode procedure; and
    a reference to a location with additional information about the second decode procedure.

7. The computer program product of claim 6, wherein the reference to the location with the additional information about the second decode procedure is in the form of a uniform resource locator (URL) or a telephone number.

8. The computer program product of claim 6, wherein the additional information about the second decode procedure includes one or more of:
    the identification of the product that implements the second decode procedure;
    the description of how to obtain the license to enable the second decode procedure;
    the description of how to obtain the key to enable the second decode procedure; and
    a reference to a second, distinct location with additional, distinct information about the second decode procedure.

9. The computer program product of claim 5, wherein the instructions are further operable to cause the data processing apparatus to:
    display the decoding information.

10. The computer program product of claim 5, wherein the instructions are further operable to cause the data processing apparatus to:
    use the decoding information to enable the second decode procedure.

11. The computer program product of claim 1, wherein the first decode procedure comprises:
    decoding the payload according to a publicly available symbology.

12. The computer program product of claim 1, wherein the second decode procedure comprises:
   decoding the payload according to a proprietary symbology.

13. The computer program product of claim 1, wherein the second decode procedure comprises:
   decoding the payload to produce encrypted data; and
   decrypting the encrypted data.

14. The computer program product of claim 1, wherein the instructions are further operable to cause the data processing apparatus to:
   determine whether the use of the second decode procedure is authorized.

15. The computer program product of claim 14, wherein determining whether the use of the second decode procedure is authorized comprises verifying the existence of a valid license or key.

16. A computer-implemented method comprising:
   receiving code data generated by reading a machine-readable code, the code data comprising a payload;
   detecting the presence of formatting information (FI) in the code data, the FI indicating whether the payload is in a first format or a second, distinct format, where the first format is an open format and the second format is a closed format;
   if the FI is not detected, or if the FI is detected and the FI indicates that the payload is in the first format, using a first decode procedure to decode the payload; and
   if the FI is detected and the FI indicates that the payload is in the second format, using a second, distinct decode procedure to decode the payload.

17. A system comprising:
   means for receiving code data generated by reading a machine-readable code, the code data comprising a payload;
   means for detecting the presence of formatting information (FI) in the code data, the FI indicating whether the payload is in a first format or a second, distinct format, where the first format is an open format and the second format is a closed format;
   means for using a first decode procedure to decode the payload if the FI is not detected or if the FI is detected and the FI indicates that the payload is in the first format; and
   means for using a second, distinct decode procedure to decode the payload if the FI is detected and the FI indicates that the payload is in the second format.

18. A computer program product, stored on a machine-readable medium, the computer program product comprising instructions operable to cause a data processing apparatus to:
   determine whether a machine-readable code is authorized to be produced in a first format, wherein the machine-readable code is to be included in a final representation of an electronic document, the electronic document comprising one or more fields for receiving user data, and wherein the machine-readable code is to encode the user data so that the user data can be reproduced by decoding the machine-readable code;
   if the machine-readable code is authorized to be produced in the first format, set an encoding instruction to indicate to a program operable to receive the user data and to generate the final representation of the electronic document that the machine-readable code is to be produced in the first format;
   if the machine-readable code is not authorized to be produced in the first format, set the encoding instruction to indicate that the machine-readable code is to be produced in a second, distinct format; and
   associate the encoding instruction with the electronic document.

19. The computer program product of claim 18, wherein determining whether the machine-readable code is authorized to be produced in the first format comprises verifying the existence of a valid license or key.

20. The computer program product of claim 18, wherein the instructions are further operable to cause the data processing apparatus to:
   secure the encoding instruction.

21. The computer program product of claim 20, wherein securing the encoding instruction comprises associating a digital signature with the encoding instruction.

22. The computer program product of claim 21, wherein the digital signature is based on licensing information.

23. The computer program product of claim 18, wherein the first format is an open format and the second format is a closed format.

24. The computer program product of claim 23, wherein the closed format corresponds to the use of a proprietary symbology.

25. The computer program product of claim 23, wherein the closed format corresponds to the use of an encryption algorithm.

26. The computer program product of claim 18, wherein associating the encoding instruction with the electronic document comprises storing the encoding instruction in the electronic document.

27. The computer program product of claim 18, wherein associating the encoding instruction with the electronic document comprises storing the encoding instruction and a reference to the electronic document in a database or a catalog.

28. The computer program product of claim 18, wherein the encoding instruction comprises encoding information related to how to produce the machine-readable code.

29. The computer program product of claim 28, wherein the encoding information includes one or more of:
   an identification of a procedure to use to produce the machine-readable code;
   an identification of an encoding program to use to produce the machine-readable code; and
   an identification of a key to use to produce the machine-readable code.

30. The computer program product of claim 18, wherein the encoding instruction comprises decoding information to be encoded into the machine-readable code.

31. The computer program product of claim 30, wherein the decoding information includes one or more of:
   an identification of a product that can be used to decode the machine-readable code;
   a description of how to obtain a license to decode the machine-readable code;
   a description of how to obtain a key to decode the machine-readable code; and
   a reference to a location with additional information about how to decode the machine-readable code.

32. The computer program product of claim 18, wherein the encoding instruction comprises a script to be executed in order to determine whether to produce the machine-readable code in the first format or the second format.

33. The computer program product of claim 18, wherein the encoding instruction comprises a reference to additional information to be used to determine whether to produce the machine-readable code in the first format or the second format.

34. A computer-implemented method comprising:
    determining whether a machine-readable code is authorized to be produced in a first format, wherein the machine-readable code is to be included in a final representation of an electronic document, the electronic document comprising one or more fields for receiving user data, and wherein the machine-readable code is to encode the user data so that the user data can be reproduced by decoding the machine-readable code;
    if the machine-readable code is authorized to be produced in the first format, setting an encoding instruction to indicate to a program operable to receive the user data and to generate the final representation of the electronic document that the machine-readable code is to be produced in the first format;
    if the machine-readable code is not authorized to be produced in the first format setting the encoding instruction to indicate that the machine-readable code is to be produced in a second, distinct format; and
    associating the encoding instruction with the electronic document.

35. A system comprising:
    means for determining whether a machine-readable code is authorized to be produced in a first format, wherein the machine-readable code is to be included in a final representation of an electronic document, the electronic document comprising one or more fields for receiving user data, and wherein the machine-readable code is to encode the user data so that the user data can be reproduced by decoding the machine-readable code;
    means for setting an encoding instruction to indicate to a program operable to receive the user data and to generate the final representation of the electronic document that the machine-readable code is to be produced in the first format, if the machine-readable code is authorized to be produced in the first format;
    means for setting the encoding instruction to indicate that the machine-readable code is to be produced in a second, distinct format, if the machine-readable code is not authorized to be produced in the first format; and
    means for associating the encoding instruction with the electronic document.

36. A computer program product, stored on a machine-readable medium, the computer program product comprising instructions operable to cause a data processing apparatus to:
    receive an electronic document, the electronic document comprising one or more fields for receiving user data to be encoded into a machine-readable code;
    receive user input comprising the user data to be encoded into the machine-readable code;
    inspect an encoding instruction associated with the electronic document to determine whether to produce the machine-readable code in a first format or a second, distinct format, where the first format is an open format and the second format is a closed format; and
    produce the machine-readable code in the first format or the second format depending on the encoding instruction, the machine-readable code being included in a final representation of the electronic document and encoding the user data so that the user data can be reproduced by decoding the machine-readable code.

37. The computer program product of claim 36, wherein the machine-readable code is a two-dimensional (2D) bar code.

38. The computer program product of claim 36, wherein the machine-readable code is a radio frequency identification (RFID) tag.

39. The computer program product of claim 36, wherein producing the machine-readable code comprises printing the machine-readable code.

40. The computer program product of claim 36, wherein the instructions are further operable to;
    validate the encoding instruction.

41. The computer program product of claim 40, wherein validating the encoding instruction comprises authenticating a digital signature associated with the encoding instruction.

42. The computer program product of claim 36, wherein the encoding instruction is stored in the electronic document.

43. The computer program product of claim 36, wherein the encoding instruction is stored in a database, and wherein inspecting the encoding instruction comprises looking up the electronic document in the database.

44. The computer program product of claim 36, wherein the encoding instruction comprises encoding information related to how to produce the machine-readable code, and wherein the instructions are further operable to:
    use the encoding information to determine how to produce the machine-readable code.

45. The computer program product of claim 44, wherein the encoding information includes one or more of:
    an identification of a procedure to use to produce the machine-readable code;
    an identification of an encoding program to use to produce the machine-readable code; and
    an identification of a key to use to produce the machine-readable code.

46. The computer program product of claim 36, wherein the encoding instruction comprises decoding information to be encoded into the machine-readable code, and wherein producing the machine-readable code comprises encoding the decoding information into the machine-readable code.

47. The computer program product of claim 46, wherein the decoding information includes one or more of:
    an identification of a product that can be used to decode the machine-readable code;
    a description of how to obtain a license to decode the machine-readable code;
    a description of how to obtain a key to decode the machine-readable code; and
    a reference to a location with additional information about how to decode the machine-readable code.

48. The computer program product of claim 36, wherein the encoding instruction comprises a script, and wherein inspecting the encoding instruction comprises executing the script.

49. The computer program product of claim 36, wherein the encoding instruction comprises a reference to additional information to be used to determine whether to produce the machine-readable code in the first format or the second format, and wherein inspecting the encoding instruction comprises inspecting the additional information.

50. The computer program product of claim 36, wherein producing the machine-readable code comprises encoding formatting information into the machine-readable code, the formatting information indicating whether the user data in the machine-readable code is encoded in the first format or the second format.

51. The computer program product of claim 50, wherein the formatting information includes decoding information related to how to decode the machine-readable code.

52. The computer program product of claim 51, wherein the decoding information includes one or more of:
- an identification of a product that can be used to decode the machine-readable code;
- a description of how to obtain a license to decode the machine-readable code;
- a description of how to obtain a key to decode the machine-readable code; and
- a reference to a location with additional information about how to decode the machine-readable code.

53. The computer program product of claim 36, wherein producing the machine-readable code in the first format comprises:
- encoding the user data using a publicly available symbology.

54. The computer program product of claim 36, wherein producing the machine-readable code in the second format comprises:
- encoding the user data using a proprietary symbology.

55. The computer program product of claim 36, wherein producing the machine-readable code in the second format comprises:
- encrypting the user data to produce encrypted data; and
- encoding the encrypted data.

56. A computer-implemented method comprising:
- receiving an electronic document, the electronic document comprising one or more fields for receiving user data to be encoded into a machine-readable code;
- receiving user input comprising the user data to be encoded into the machine-readable code;
- inspecting an encoding instruction associated with the electronic document to determine whether to produce the machine-readable code in a first format or a second, distinct format, where the first format is an open format and the second format is a closed format; and
- producing the machine-readable code in the first format or the second format depending on the encoding instruction, the machine-readable code being included in a final representation of the electronic document and encoding the user data so that the user data can be reproduced by decoding the machine-readable code.

57. A system comprising:
- means for receiving an electronic document, the electronic document comprising one or more fields for receiving user data to be encoded into a machine-readable code;
- means for receiving user input comprising the user data to be encoded into the machine-readable code;
- means for inspecting an encoding instruction associated with the electronic document to determine whether to produce the machine-readable code in a first format or a second, distinct format, where the first format is an open format and the second format is a closed format; and
- means for producing the machine-readable code in the first format or the second format depending on the encoding instruction, the machine-readable code being included in a final representation of the electronic document and encoding the user data so that the user data can be reproduced by decoding the machine-readable code.

58. A computer-implemented method comprising:
- generating an electronic document, the electronic document comprising one or more fields for receiving user data;
- determining whether a machine-readable code to be included in a final representation of the electronic document is authorized to be produced in a first format or a second, distinct format;
- setting an encoding instruction to indicate whether the machine-readable code is authorized to be produced in the first format or the second format;
- associating the encoding instruction with the electronic document;
- receiving user input comprising the user data;
- inspecting the encoding instruction associated with the electronic document to determine whether to produce the machine-readable code in the first format or the second format;
- producing the machine-readable code by encoding the user data in the first format or the second format depending on the encoding instruction, the machine-readable code being included in the final representation of the electronic document;
- reading the machine-readable code in the final representation of the electronic document to generate code data;
- determining whether the code data is in the first format or the second format; and
- reproducing the user data by decoding the code data according to a first decode procedure if the code data is in the first format, or according to a second, distinct decode procedure if the code data is in the second format, wherein decoding the code data according to the second decode procedure comprises determining whether use of the second decode procedure is authorized.

59. A system comprising:
- means for generating an electronic document, the electronic document comprising one or more fields for receiving user data;
- means for determining whether a machine-readable code to be included in a final representation of the electronic document is authorized to be produced in a first format or a second, distinct format;
- means for setting an encoding instruction to indicate whether the machine-readable code is authorized to be produced in the first format or the second format;
- means for associating the encoding instruction with the electronic document;
- means for receiving user input comprising the user data;
- means for inspecting the encoding instruction associated with the electronic document to determine whether to produce the machine-readable code in the first format or the second format;
- means for producing the machine-readable code by encoding the user data in the first format Or the second format depending on the encoding instruction, the machine-readable code being included in the final representation of the electronic document;
- means for reading the machine-readable code in the final representation of the electronic document to generate code data;
- means for determining whether the code data is in the first format or the second format; and
- means for reproducing the user data by decoding the code data according to a first decode procedure if the code data is in the first format, or according to a second, distinct decode procedure if the code data is in the second format, wherein decoding the code data according to the second decode procedure comprises determining whether use of the second decode procedure is authorized.

* * * * *